(12) United States Patent
Glickman et al.

(10) Patent No.: US 12,516,995 B2
(45) Date of Patent: Jan. 6, 2026

(54) LIQUID OCCLUSION EJECTION FROM A PRESSURE SENSOR CAVITY WITH PULSED LIQUID HEATING

(71) Applicant: Apple Inc., Cupertino, CA (US)

(72) Inventors: Michael J. Glickman, Mountain View, CA (US); Gregory B. Arndt, San Jose, CA (US)

(73) Assignee: Apple Inc., Cupertino, CA (US)

( * ) Notice: Subject to any disclaimer, the term of this patent is extended or adjusted under 35 U.S.C. 154(b) by 332 days.

(21) Appl. No.: 18/465,892

(22) Filed: Sep. 12, 2023

(65) Prior Publication Data

US 2025/0085181 A1 Mar. 13, 2025

(51) Int. Cl.
*G01L 19/06* (2006.01)
*G01L 27/00* (2006.01)

(52) U.S. Cl.
CPC ...... *G01L 19/0654* (2013.01); *G01L 19/0636* (2013.01); *G01L 19/0645* (2013.01); *G01L 27/007* (2013.01)

(58) Field of Classification Search
CPC .................................................... G01L 27/007
See application file for complete search history.

(56) References Cited

U.S. PATENT DOCUMENTS

| | | | | |
|---|---|---|---|---|
| 4,490,728 A | * | 12/1984 | Vaught | B41J 2/04591 347/56 |
| 10,768,067 B2 | * | 9/2020 | Arndt | G01L 19/12 |

* cited by examiner

*Primary Examiner* — Herbert K Roberts
(74) *Attorney, Agent, or Firm* — BAKERHOSTETLER

(57) ABSTRACT

Aspects of the subject technology relate to electronic devices with pressure sensors. Pressure sensor occlusion may be mitigated by ejecting occluding liquid with pulsed liquid heating. Processing circuit of the electronic device can obtain pressure sensor data from the pressure sensor and determine that the opening is occluded based at least in part on a change in pressure within a cavity adjacent the opening. The processing circuitry applies a first power pulse to a heating element during a first phase to cause the heating element to form a gas pocket around the heating element by heating at least a portion of a water volume inside the cavity and applies a second power pulse to the heating element during a second phase following the first phase to cause the heating element to expand the gas pocket around the heating element by further heating the water volume inside the cavity.

19 Claims, 7 Drawing Sheets

LIQUID OCCLUSION EJECTION FROM A PRESSURE SENSOR CAVITY WITH PULSED LIQUID HEATING

TECHNICAL FIELD

The present description relates generally to portable electronic devices, and more particularly, but not exclusively, to portable electronic devices with pressure sensors.

BACKGROUND

Electronic pressure sensors are often used to obtain barometric pressure measurements for elevation and/or weather measurements. However, challenges can arise when attempting to implement an electronic pressure sensor in a portable electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
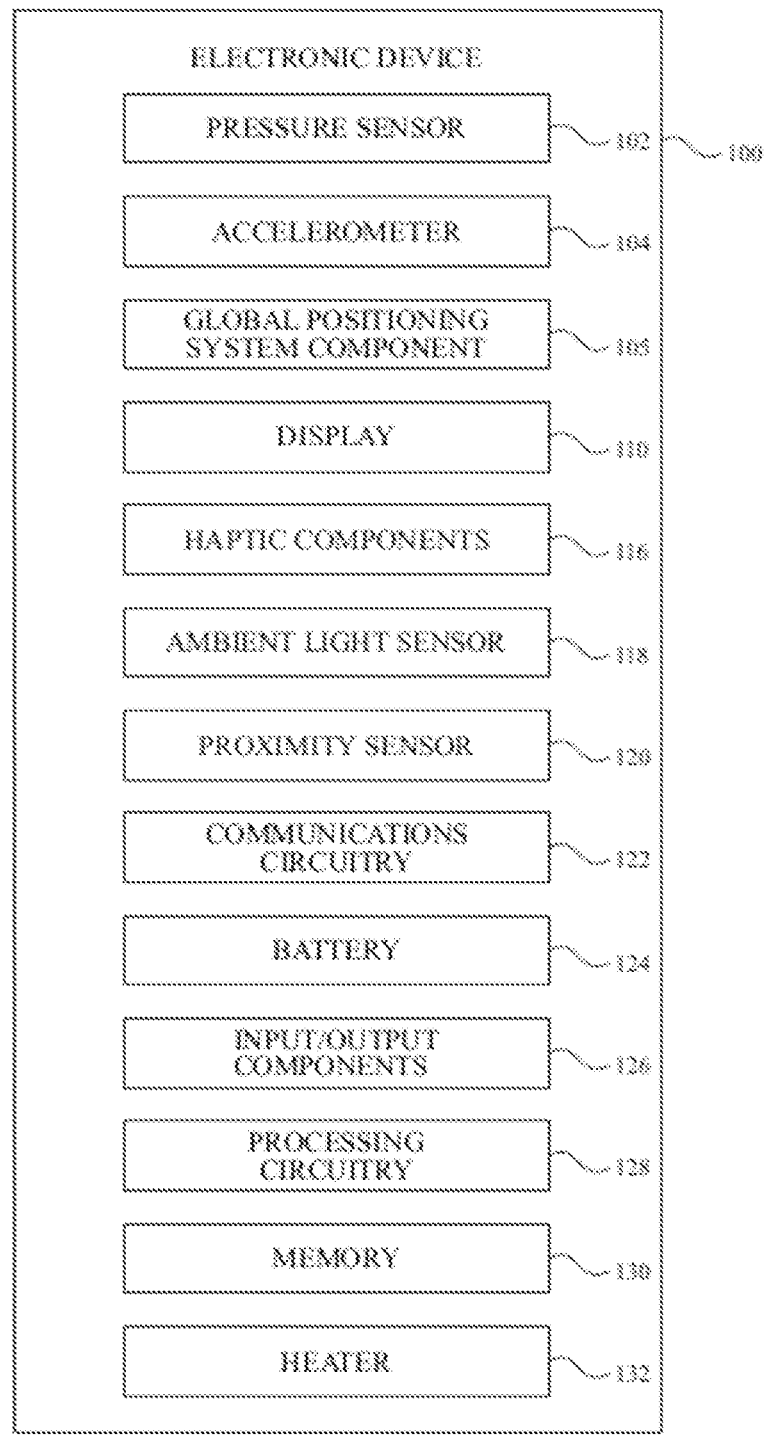
FIG. 1 illustrates a schematic diagram of an electronic device having a pressure sensor in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Portable electronic devices such as a mobile phones, portable music players, smart watches, and tablet computers are provided that include a pressure sensor for sensing environmental pressure. The pressure sensor is sometimes used for barometric pressure measurements, which can be used to identify changes in elevation. The changes in elevation are sometimes used to identify a location or exercise performed by a user of the device (e.g., by an activity monitor application running on processing circuitry of the device when the device is worn or carried by the user while the user walks or runs up a flight of stairs or up a hill).

Pressure sensors are disposed within a housing of the portable electronic device and can sense the environmental pressure outside the housing due to airflow from outside the housing into the housing at various openings or ports. Similarly, a microphone may be disposed within the housing of the portable electronic device and can output audible sound through an opening or port in the housing. However, the opening, and/or an internal volume of the port within which the pressure sensor and/or microphone is disposed, can become occluded by environmental aggressors such as a liquid, a portion of a user's skin, or a piece of clothing at or near the port, all of which can alter the performance of the sensor.

The performance of a liquid occluded pressure sensor or microphone can deteriorate significantly. This degradation occurs because the liquid can block airflow to the sensor (occlusion) and capillary forces can pull on the sensing membrane or gel. In the case of occlusion, the pressure at the sensor may no longer equalize to the outside air, and any volume from evaporation can create a false pressure signal. In the occlusion case, any enclosed volume of air will follow the ideal gas law, creating a large temperature coefficient of offset (TCO). In the case of a microphone, occlusion can block sounds, and bursting of bubbles and membrane can create sounds that are detected as very loud.

Embodiments of the subject technology provide for the mitigation of occlusion in a pressure sensor by removal of the liquid occlusion with pulsed liquid heating. The primary cause of the liquid occlusion is typically the presence of a particulate protection element in the portable electronic device, such as a mesh or a protective cap. For example, a liquid film will form within apertures of the particulate protection element thus leading to the occlusion of liquid, and therefore obstructing pressure transmission. In accordance with various aspects of the subject disclosure, a portable electronic device is provided that includes a pressure sensor and a heating element. Processing circuitry in the portable electronic device identifies occlusions of the pressure sensor and expels the occluding liquid with pulsed heating of the occluding liquid, as described in further detail hereinafter. The heating element may be implemented as a coil intended for sensing or heating purposes. In one or more other implementations, the heating element may be a wire-bond wire extending from a waterproofing gel. In one or more other implementations, the heating element may be a film-based heater integrated into either the lid or the protective cap, specifically for protection purposes. Placing the heating element within the lid or the protective cap involves a layered arrangement, in which heating trace elements are integrated, likely forming part of the structure. However, in one or more implementations, a significant portion of generated heat may conduct back into the lid or cap material, resulting in a decrease of power efficiency optimization. To circumvent such inefficiencies and enhance power utilization, embodiments of the subject technology provide for isolating the heating element from the packaging (e.g., housing) that comes into contact with the liquid. Electrical conductors are effective at conducting heat, but heat conduction can be reduced by increasing the ratio of the length to the thickness. Aspects of the subject technology incorporate a wire-like structure with a large length-to-thickness ratio, possibly a bond wire, in conjunction with a gas (e.g., air) to create a gas pocket inside occluded liquid (e.g., a water vapor pocket).

The objective of this approach is to expel the liquid with minimal power consumption by way of applying pressure to a gas pocket inside the liquid (e.g., a water vapor pocket), consequently causing the pressure to break through the film caused by the occluded liquid trapped within the apertures of the particulate protection element. Rather than directly activating the power, the heater is designed to be activated with high power in a first phase, aiming to create a small air pocket inside the liquid.

Once the heating element has created the air pocket around itself and inside the liquid, the heating element becomes better insulated from the liquid, thereby avoiding excessive power conduction into the surrounding housing or opening. The rationale behind this is to improve the power efficiency. Instead of solely converting the occluding liquid (e.g., water) to vapor, which requires substantial energy consumption by the device, the approach emphasizes the forceful expulsion of both air and liquid using the pressure generated by both the liquid to gas phase transition in a first phase and the ideal gas law expansion of the liquid vapor in a subsequent second phase. This expulsion method can be likened to a "whale-like blowhole." By prioritizing expulsion over complete phase conversion (e.g., converted only a small portion of the liquid to gas), the efficiency of the process is significantly enhanced. This technique provides for addressing liquid occlusion and pressure-related challenges in pressure sensors and/or microphone ports, ultimately improving their overall performance.

A schematic block diagram of an illustrative electronic device with a pressure sensor is shown in FIG. 1. In the example of FIG. 1, device 100 includes pressure sensor 102 and accelerometer 104. Pressure sensor 102 includes a pressure sensing element (e.g., a micro-electromechanical system (MEMS) element, a piezo element, a membrane coupled to a capacitive or resistive transducer circuit, etc.) and may include processing circuitry 128 for the pressure sensor 102. Accelerometer 104 includes electronic components that generate an acceleration signal responsive to physical accelerations of the accelerometer 104 (e.g., due to acceleration of device 100).

Device 100 also includes processing circuitry 128 and memory 130. Memory 130 may include one or more different types of storage such as nonvolatile memory (e.g., flash memory or other electrically-programmable-read-only memory), volatile memory (e.g., static or dynamic random-access-memory), magnetic or optical storage, permanent or removable storage and/or other non-transitory storage media configure to store static data, dynamic data, and/or computer readable instructions for processing circuitry 128. Processing circuitry 128 may be used in controlling the operation of device 100. Processing circuitry 128 may sometimes be referred to as system circuitry or a system-on-chip (SOC) for device 100.

Processing circuitry 128 may include a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, processing circuitry 128 may be used to run software for device 100, such as activity monitoring applications, pressure sensing applications, acceleration sensing application, occlusion detection applications using pressure data and accelerometer data, internet browsing applications, email applications, media playback applications, operating system functions, software for capturing and processing images, software implementing functions associated with gathering and processing sensor data, software that controls audio, visual, and/or haptic functions.

In the example of FIG. 1, device 100 also includes display 110, communications circuitry 122, battery 124, and input/output components 126. Input/output components 126 may include a touch-sensitive layer of display 110, a keyboard, a touch-pad, and/or one or more real or virtual buttons. Input/output components 126 may also include audio components such as one or more speakers and/or one or more microphones. In some scenarios a speaker membrane or a microphone membrane can be operated to move air to affect and/or clear occlusions of one or more ports in a housing of device 100.

One or more heaters such as heater 132 (e.g., resistive heating elements or other heating elements) may be provided in device 100. Heater 132 may be operated by processing circuitry 128 to help clear a liquid occlusion by expelling the occluding liquid by raising the temperature of an air pocket formed around the heater 132 and within a liquid to force the occluded liquid to expel out through an opening or port of the device 100.

Communications circuitry 122 may be implemented using WiFi, near field communications (NFC), Bluetooth®, radio, microwave, and/or other wireless and/or wired communications circuitry. Communications circuitry 122 may be operated by processing circuitry 128 based on instructions stored in memory 130 to perform cellular telephone, network data, or other communications operations for device 100. Communications circuitry 122 may include WiFi and/or NFC communications circuitry operable to communicate with an external device such a mobile telephone or other remote computing device. In some scenarios, data communications with an external device such as communications by circuitry 122 of a smart watch with a host mobile phone may allow the use of data from the external device, in combination with pressure sensor data and/or acceleration data from the watch to identify and/or characterize a pressure sensor occlusion.

As shown in FIG. 1, device 100 may include other components such as a global positioning system (GPS) component 105, haptic components 116 (e.g., one or more vibratory or other actuable devices that can produce tactile responses for a user and/or other desired accelerations of device 100), and/or other sensors such as ambient light sensor 118 and/or proximity sensor 120.

Figure 2:
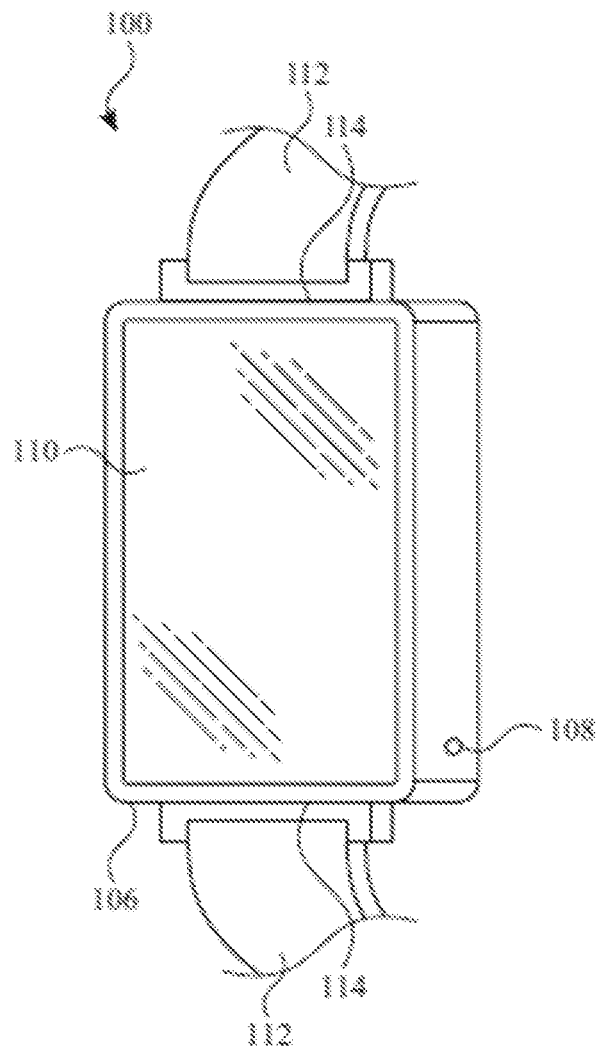
FIG. 2 illustrates a perspective view of an example electronic device implemented as a wearable device in accordance with various aspects of the subject technology.

FIG. 2 is a perspective view of electronic device 100 in a configuration in which electronic device 100 has been implemented in the form of a wearable device such as smart watch. As shown in FIG. 2, display 110 may be disposed on a front surface of housing 106. Housing 106 may include one or more openings such as opening 108. In the example of FIG. 2 opening 108 is formed in a sidewall of housing 106 and provides a fluid coupling for airflow between an environment external to housing 106 into a portion of housing 106. Pressure sensor 102 may be disposed internal to housing 106 adjacent to opening 108 to receive airflow from the external environment through opening 108.

Any or all of components 104, 104, 105, 116, 118, 120, 124, 126, 128, and 130 of FIG. 1 may be disposed on or within housing 106. One or more additional openings in housing 106 may be provided for a speaker, a microphone, an ambient light sensor, and/or a proximity sensor. Strap 112 may be coupled to housing 106 at interfaces 114 and arranged to secure device 100 to a part of a user's body such as around the user's wrist.

Figure 3A:
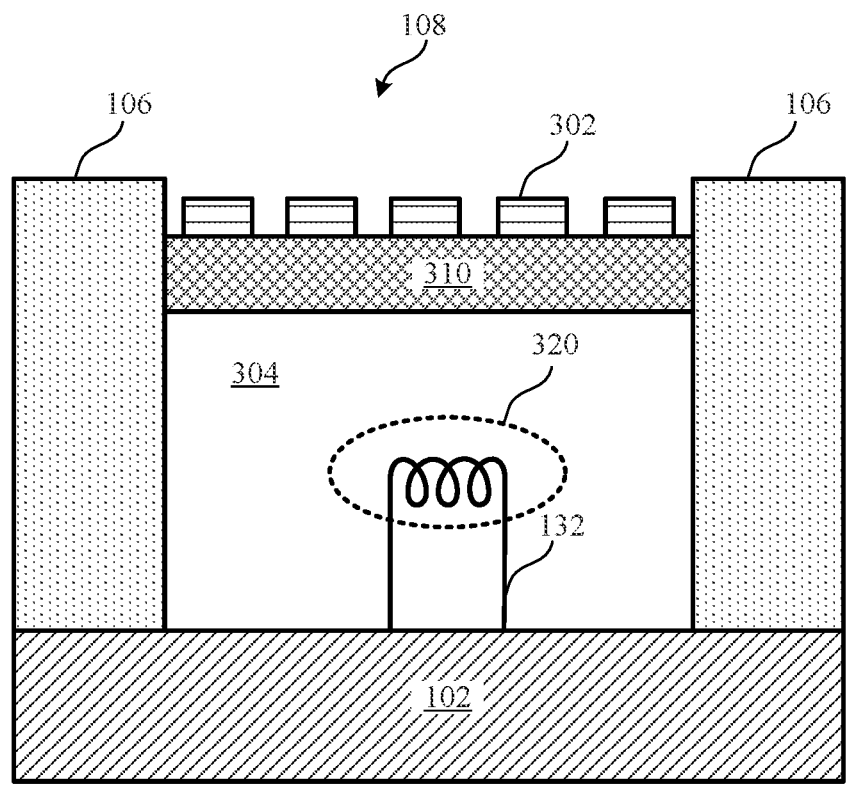
FIG. 3A illustrates a cross-sectional side view of a pressure sensor disposed in a pressure sensor port in a housing of an electronic device in accordance with various aspects of the subject technology.

FIG. 3A illustrates a cross-sectional side view of a pressure sensor 102 disposed in a pressure sensor port in a housing 106 of an electronic device 100 in accordance with various aspects of the subject technology. Specifically, FIG. 3A shows a cross-sectional side view of a portion of device 100 at the location of opening 108. As shown in FIG. 3A, pressure sensor 102 is disposed within housing 106 adjacent opening 108 in housing 106 such that pressure sensor 102 receives airflow through opening 108. A pressure sensor port for pressure sensor 102 is formed by opening 108 and a cavity 304, within housing 106 and adjacent opening 108, within which pressure sensor 102 is disposed. As illustrated in FIG. 3A, the heater 132 is positioned inside the cavity 304. As also shown in FIG. 3A, the device 100 also includes a particulate protection element 302 disposed within the opening 108. In one or more implementations, the particulate protection element 302 may be a mesh or a protective cap. In one or more other implementations, the particulate protection element 302 includes gas permeable waterproof membranes, such as barometric vents.

In the example of FIG. 3A, pressure sensor 102 may be provided with access to the airflow from the external environment through 108. However, liquid (e.g., water, oil, soap, etc.) and/or other environmental aggressors such as dust or dirt may enter cavity 304 and occlude the pressure sensor 102 and/or the port formed by opening 108 and cavity 304 from receiving unobstructed airflow for environmental pressure sensing. In this regard, FIG. 3A illustrates a scenario in which liquid 310 has entered and partially filled cavity 304.

The occluding liquid 310 can cause pressure changes or variations at the pressure sensor 102. For example, liquid 310 getting trapped in cavity 304 due to film forming within apertures of the particulate protection element 302 can cause liquid 310 to accumulate in cavity 304, thereby generating an increase in pressure in cavity 304. This increase in pressure can, if the occlusion by liquid 310 is not detected, be falsely identified as a change in elevation of device 100.

In one or more implementations, an occlusion may be detected by processing circuitry such as processing circuitry 128 of FIG. 1. Upon determination that the pressure sensor and/or the port formed by opening 108 and cavity 304 are occluded, the processing circuitry 128 takes corrective action. The corrective action may include operating an additional component within the housing 106 (e.g., the heater 132) to clear the occlusion. In one or more other implementations, the processing circuitry 128 may take other corrective action, such as providing a notification to a user of device 100 that the pressure sensor is occluded, providing instructions to the user to clear the occlusion (e.g., by shaking the device or using a drying instrument in the port), preventing pressure sensor data obtained while the sensor was occluded from being used in other applications (e.g., to identify elevation changes and/or resulting exercise minutes), or providing an occlusion notice to other components and/or applications of the device 100 (e.g., to a speaker component to indicate the need to increase speaker volume).

For the pressure sensor 102, the heater 132 can be mechanically coupled to the sensor 102, enabling it to apply heat to the area within the cavity 304. The heater 132 may be implemented with thermal isolation, likened to a light bulb filament, to pursue optimal performance of the heater 132. In one or more implementations, the heater 132 includes a coil and an insulation layer that surrounds the coil to facilitate the desired thermal isolation from the cavity 304 surroundings and/or housing 106. In one or more implementations, there may be intermediary components situated between the pressure sensor 102 and the heater 132. For example, a switching transistor or the conceptualization of a switch for activation may be included as an intermediate component.

In relation to the heater 132, pertinent characteristics warrant consideration to optimize its efficacy in facilitating efficient heating. This encompasses factors such as wire gauge, wire length, coil count, and the heat-conduction capacity necessary to achieve the desired heating rate for generating the intended air pocket within a predefined temporal window. The sizing of in the heater 132 coil's resistance necessitates alignment with the designated voltage and power levels, thus maximizing operational efficiency. Furthermore, prioritizing slender wire dimensions is recommended to augment thermal conductivity. In a theoretical scenario, infinitesimally thin wire constitutes the ultimate ideal, where both wire length and voltage tend towards infinity, thereby optimizing thermal conductivity to realize the targeted heating objectives. Such a wire may be insulated to prevent corrosion, although a thicker coating may necessitate additional power consumption because of its own heat capacity and a reduction of the heat transferred to the fluid.

The pulse liquid heating involves a two-phase process, in which a high-power pulse is initially applied, and subsequently, the power is tapered off to create an insulating layer of water vapor around the heater 132. The initiation and termination of applying both phase one and phase two of the two-phase process for the pulsed liquid heating may include a variety of methods, encompassing sensor-based triggers, manual interventions, and the like. These aspects will be comprehensively addressed within the specification, delving into the various potential mechanisms for initiation, cessation, and control. However, the central novelty of the subject technology lies in the operational methodology, particularly within phase one, involving the delivery of a microburst of heat with the heater 132 to generate a bubble (or air pocket 320) within the cavity 304. Subsequently, phase two reduces heat intensity of the heater 132 to facilitate the removal of remaining occluding liquid after penetrating the occluding liquid film formed within apertures of the particulate protection element 302, which will be discussed in more detail in FIG. 4A. In some aspects, the objective of phase one is not solely to breach the occluding liquid film, but rather to establish the air pocket 320 around the coil of the heater 132. Operation in phase two focuses on optimizing efficiency through breaking the occluding liquid film by expanding the water vapor pocket using ideal gas law expansion, with the objective of expelling the liquid occlusion. This approach is more energy-efficient compared to traditional techniques that attempt to heat the occluding liquid to a boiling state for purpose of evaporation or increasing evaporation rates by elevated heating, which necessitate higher power consumption.

To begin the two-phase process, in one or more implementations, the presence of the liquid trapped within the cavity 304 may be detected. Subsequently, the processing circuitry 128 may verify that water exposure with the device 100 has ended (or is at least near completion). This step facilitates proper operation of the two-phase process, as beginning the two-phase process while the device 100 is submerged, such as at a depth of two meters, in one or more implementations, would be impractical and result in unnecessary power consumption. Therefore, the processing circuitry 128 can monitor and detect that the user has finished an activity that comes in persistent contact with water and determine whether the user of the device has initiated engagement in normal activities, such as walking, before proceeding to initiate the first phase of the pulsed liquid heating. In one or more implementations, processing circuitry 128 obtains, based at least in part on a determination that the opening is occluded, one or more activity signals associated with the device 100. In one or more implementations, processing circuitry 128 determines whether water contact with the device 100 is proximate to completion based on the one or more activity signals. In one or more implementations, processing circuitry 128 activates the heater 132 in response to a determination that water contact with the device 100 is proximate to completion. In one or more implementations, processing circuitry 128 refrains from activating the heater 132 in response to a determination that water contact with the device 100 is not proximate to completion. In one or more implementations, processing circuitry 128 delays activation of the heater 132 in response to a determination that water contact with the device 100 is not proximate to conclusion.

In a low battery scenario, the maximum power that can be applied to the heater 132 may be limited compared to a full battery scenario due to voltage limitations and the need to avoid overloading the device 100 or exceeding the heater 132 material's thermal limits. As for enabling or initiating the two-phase process for pulsed liquid heating in a low battery scenario, there may be potential restrictions, but the final decision may lie with the user of the device 100 or a preconfigured setting by the manufacturer of the device 100, considering safety and operational concerns.

Figure 3B:
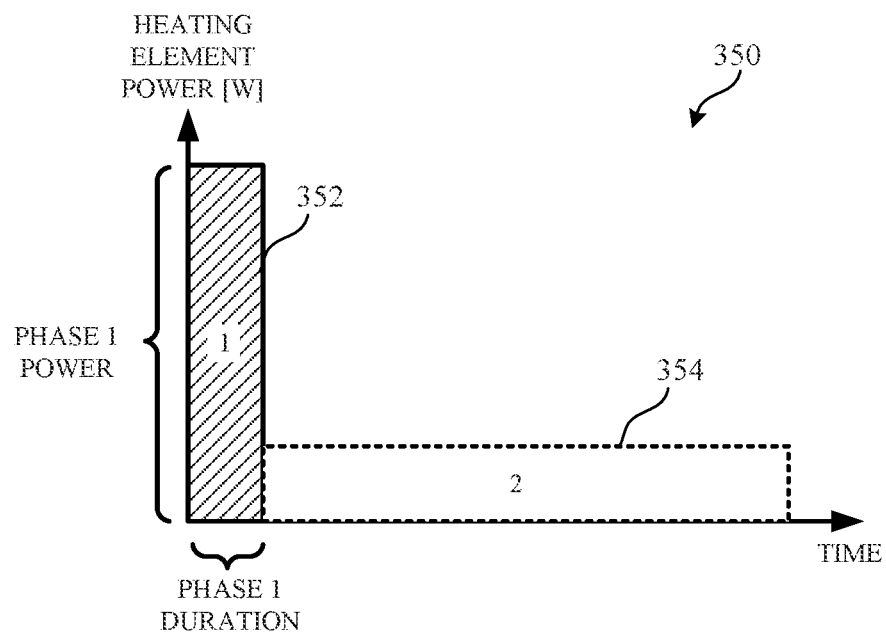
FIG. 3B illustrates a two-dimensional graph depicting a first power pulse applied to a heating element associated with the pressure sensor illustrated in FIG. 3A during a first phase in accordance with various aspects of the subject technology.

FIG. 3B illustrates a two-dimensional graph 350 depicting a first power pulse 352 applied to a heating element (e.g., the heater 132) associated with the pressure sensor 102 illustrated in FIG. 3A during a first phase of the two-phase process in accordance with various aspects of the subject technology. As illustrated in FIG. 3B, the graph 350 also includes a second power pulse 354 that is disabled (or inactive) during the first phase and is active and applied to the heating element during a second phase of the two-phase process.

Regarding the heating element power of the first phase of the two-phase process (or "phase one"), the range of power that can be applied to the heater 132 during phase one may be in the order of tens of watts. Regarding the heating element power of the second phase of the two-phase process (or "phase two"), the range of power that can be applied to the heater 132 during phase two may be in the order of tens of milliwatts. In one or more implementations, the heating element power in phase one compared to the heating element power in phase two may be considerably higher, possibly around 100 times higher, but the ratio of the first phase power to the second phase power may vary depending on implementation. In one or more implementations, phase one features a duration that is relatively short in time such as a span measured in hundreds of microseconds. In one or more implementations, the duration of phase one may be in the range of 10 microseconds to 1 millisecond. Comparatively, in one or more implementations, phase two features a duration that is relatively longer in time than phase one, such as a span length of a few seconds. In one or more implementations, the duration of phase one compared to the duration of phase two may correspond to a predefined ratio. For example, the predefined ratio may be 1:1000 between phase one and phase two. To illustrate, if phase one encompasses 100 microseconds, then phase two may extend to a maximum duration of about 10 seconds.

Regarding the limits of power that can be implemented with either the first power pulse 352 in phase one or the second power pulse 354 in phase two, the maximum power may be determined by factors such as the power output of the battery 124, the voltage drop across electrical traces coupled to terminals of the heater 132, and the thermal limits of the heater 132 material. For example, the material used for the heater 132 may have specific ratings that should not be exceeded.

In one or more implementations, the duration of phase one is fixed. In one or more other implementations, the duration of phase one is variable. In such a case, the power pulse intensity (e.g., along the y-axis) can vary accordingly. For example, if the duration of phase one is shorter than the original fixed scenario, the energy intensity of the first power pulse 352 will be higher in the shorter duration. Conversely, if the duration of phase one is longer than the original fixed scenario, the energy intensity of the first power pulse 352 will be smaller in the longer duration. In one or more other implementations, the energy intensity of the first power pulse 352 may remain constant irrespective of the duration of phase one.

In one or more implementations, the processing circuitry 128 applies a single instance of the first power pulse 352 followed by a single instance of the second power pulse 354. In one or more other implementations, the processing circuitry 128 may apply a number of first power pulses 352 followed by a number of second power pulses 354 in a sequence. In one or more other implementations, the processing circuitry 128 may apply multiple first power pulses 352 in succession or in a periodic manner for the purpose of forming the desired air pocket 320 around the heater 132. For instance, the approach of applying the first power pulse 352 and subsequently measuring the success of the first power pulse 352 by employing a specific metric that measures the presence of the air pocket 320, followed by another instance of the first power pulse 352, and continuing this process until formation of the air pocket 320 is successful. Consequently, the processing circuitry 128 may acquire real-time measurements during both phase one and phase two. In a case scenario where either one of phase one or phase two is not successful, the processing circuitry 128 may initiate a retry sequence involving phase one and/or phase two. However, in one or more implementations, the processing circuitry 128 may involve endpoint detection to minimize unnecessary power consumption caused by liquid occlusion detection or correlation with pressure and movement.

The high heat capacity possessed by the liquid confined within the cavity 304, coupled with its efficient heat conduction through convection, necessitates a substantial power input to initiate evaporation of the occluded liquid. In operation, the processing circuitry 128 applies a brief (e.g., <100 µs) but intense pulse of high power (e.g., the first power pulse 352) to vaporize a minute fraction of the liquid volume confined in the cavity 304. This vaporization gives rise to the air pocket 320 to form within the cavity 304 and encompassing at least a portion of the heater 132. In this scenario, the air pocket 320 is intended to exhibit significantly enhanced insulating properties compared to its liquid state. The phase transition event from liquid state to vapor state, even within this minute fraction of the liquid volume, induces substantial pressures, consequently expelling the liquid 310 with gradual pressure-driven kinetics, as opposed to evaporation.

Figure 4A:
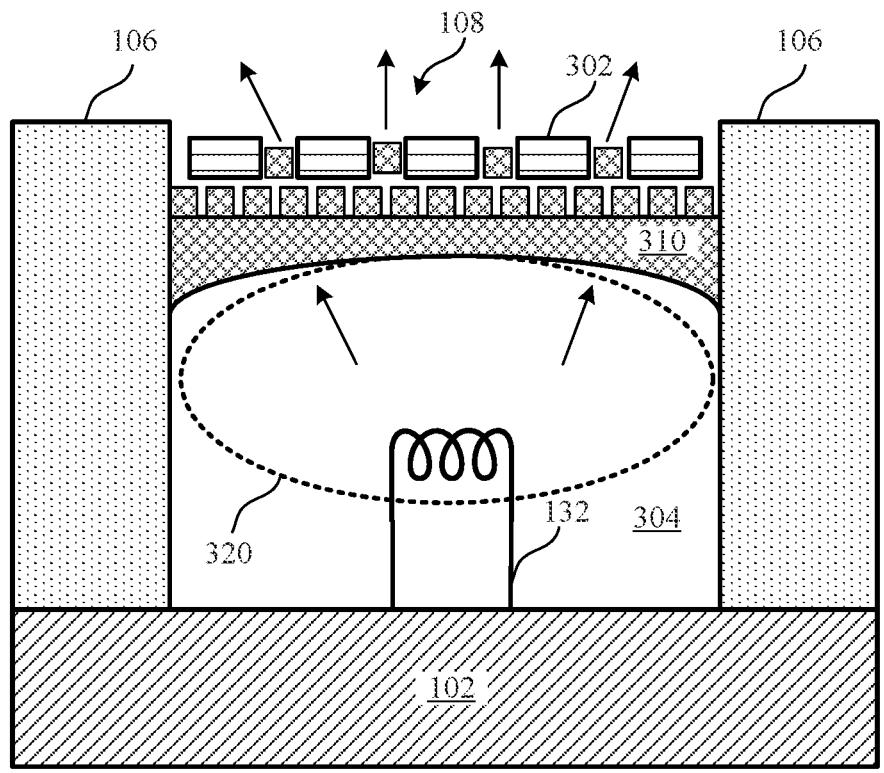
FIG. 4A illustrates a cross-sectional side view of a pressure sensor disposed in a pressure sensor port in a housing of an electronic device in accordance with various aspects of the subject technology.

FIG. 4A illustrates a cross-sectional side view of the pressure sensor 102 disposed in a pressure sensor port in the housing 106 of the electronic device 100 in accordance with various aspects of the subject technology. In this regard, FIG. 4A illustrates a scenario in which the air pocket 320 has expanded and is pressing against the inner wall surface of the liquid 310 in an attempt to rupture (or break) the film formed within the apertures of the particulate protection element 302.

The duration of phase two may depend on the thermal insulative characteristics of the air pocket 320, allowing for a more efficient expansion of the air pocket 320 using the heater 132. The ensuing expansion of the air pocket 320 may follow ideal gas behavior. This augmented pressure formed within the duration of phase two can be harnessed to rupture any occluding liquid film that may form on apertures present on the particulate protection element 302. These occluding liquid films often lead to pressure readings at the pressure sensor 102 that diverge from the ambient atmospheric pressure, rendering them incongruous.

Figure 4B:
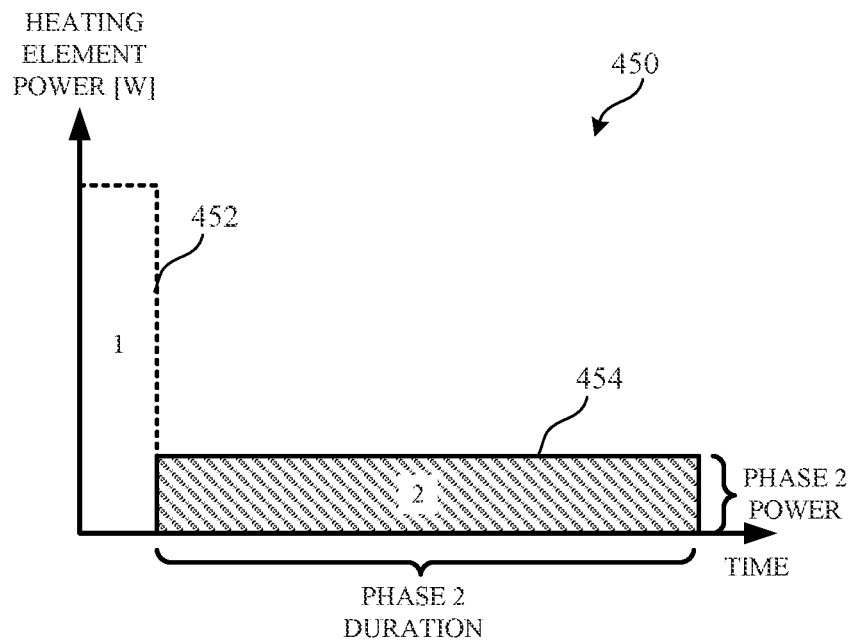
FIG. 4B illustrates a two-dimensional graph depicting a second power pulse applied to a heating element associated with the pressure sensor illustrated in FIG. 4A during a second phase in accordance with various aspects of the subject technology.

FIG. 4B illustrates a two-dimensional graph depicting a second power pulse 454 applied to a heating element (e.g., the heater 132) associated with the pressure sensor 102 illustrated in FIG. 4A during a second phase in accordance with various aspects of the subject technology. In phase two, the power intensity of the second power pulse 454, represented on the y-axis, is fixed over its duration in one or more implementations. As illustrated in FIG. 4B, the graph 450 also includes a first power pulse 452 that is disabled (or inactive) during the second phase and is active and applied to the heating element during a first phase of the two-phase process.

During phase two, in one or more other implementations, the amount of power applied to the heater 132 may not be fixed but rather variable depending on the extent of power conducted to the housing 106 and the stochastic process involved in breaking the occluding liquid film. In this regard, the energy needed to break the occluding liquid film may not remain constant during phase two. Consequently, phase two may continue until the pressured applied by the expanding air pocket 320 surpasses a threshold for film breaking. The duration of phase two can differ on a case-by-case basis due to these variations.

An additional end signal may indicate that during phase two, as the pressure in the cavity 304 increases due to occlusion, it subsequently decreases upon breaking the occluding liquid film trapped within the apertures of the particulate protection element 302. This change in pressure can be detected as an endpoint for detection.

Figure 5:
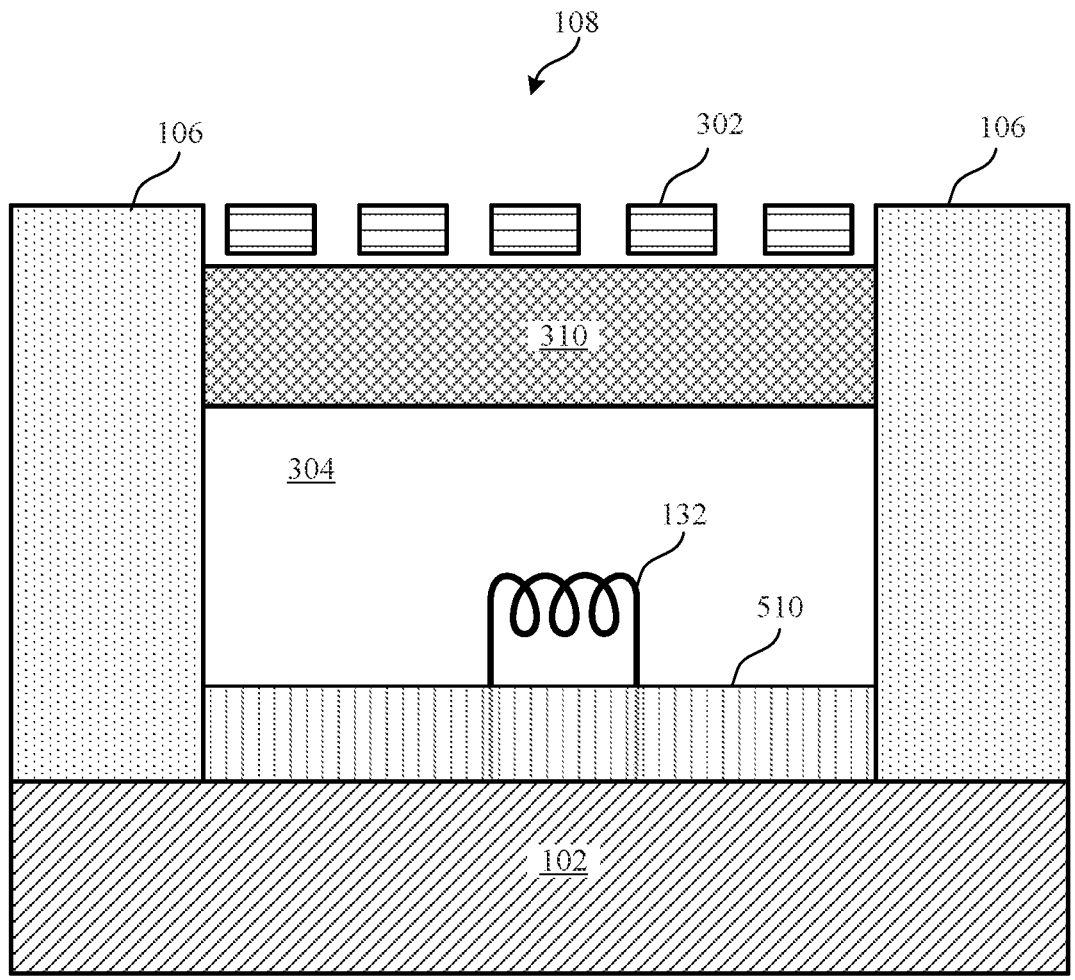
FIG. 5 illustrates a cross-sectional side view of another example of a pressure sensor disposed in a pressure sensor port in a housing of an electronic device in accordance with various aspects of the subject technology.

FIG. 5 illustrates a cross-sectional side view of another example of the pressure sensor 102 disposed in a pressure sensor port in the housing 106 of the electronic device 100 in accordance with various aspects of the subject technology. In the example of FIG. 5, pressure sensor 102 is a water-resistant pressure sensor having a waterproofing encapsulation 510 such as a waterproofing gel disposed over the pressure sensor 102 to prevent liquid 310 from contacting the pressure sensor 102 electronics. However, liquid 310 that enters cavity 304 can impact waterproofing encapsulation 510 and can negatively affect the pressure measurements made using pressure sensor 102. As illustrated in FIG. 5, the pressure sensor 102 is disposed within the opening 108 of the device 100, along with the heater 132 embedded within the waterproofing encapsulation 510 depicted as a gel layer. The operation of the heater 132 in the implementation as depicted in FIG. 5 is similar to the operation discussed in FIGS. 3 and 4, where the objective is to form an air pocket using a brief and intense power pulse during a first phase and expand the air pocket with a tapered intensity and longer power pulse during a second phase to expel the occluding liquid from the cavity 304 through the opening 108 with outward pressures formed by the expending air pocket.

Figure 6:
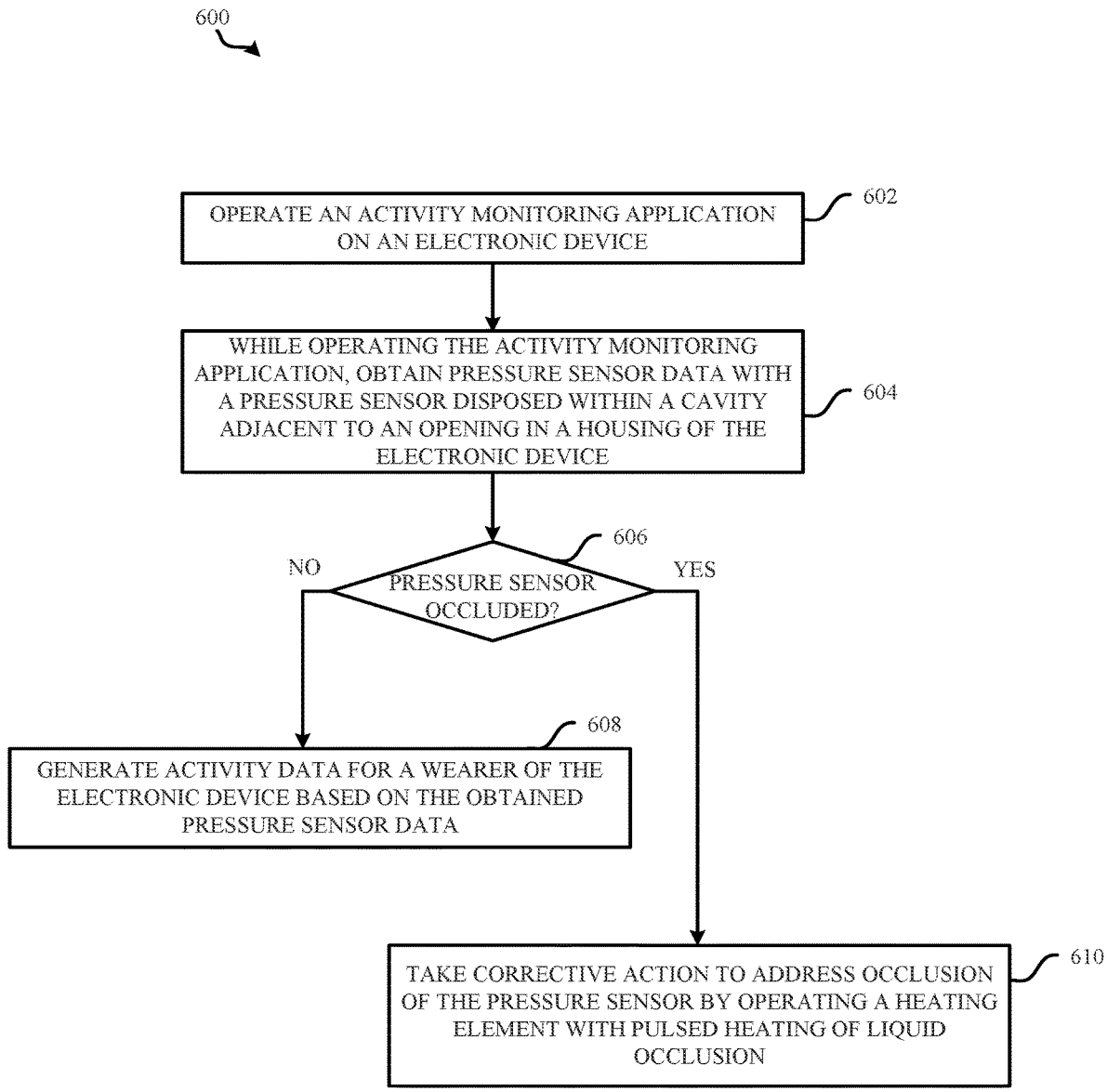
FIG. 6 illustrates a flow chart of an example process for identifying pressure sensor occlusion in accordance with various aspects of the subject technology.

FIG. 6 depicts a flow diagram of an example process for operation of device 100, in accordance with various aspects of the subject technology. For explanatory purposes, the example process of FIG. 6 is described herein with reference to the components of FIGS. 1-5. Further for explanatory purposes, some blocks of the example process of FIG. 6 are described herein as occurring in series, or linearly. However, multiple blocks of the example process of FIG. 6 may occur in parallel. In addition, the blocks of the example process of FIG. 6 need not be performed in the order shown and/or one or more of the blocks of the example process of FIG. 6 need not be performed.

In the depicted example flow diagram, at step 602, an activity monitoring application of a wearable electronic device 100 such as smart watch of FIG. 2 may be operated. Operating the activity monitoring application may include monitoring an activity of a wearer of a smart watch with the activity monitoring application of the smart watch (e.g., by monitoring the position, motion, elevation, acceleration, and/or position of device 100 using various sensors within the device 100).

At step 604, while operating the activity monitoring application, pressure data may be obtained with a pressure sensor (e.g., pressure sensor 102) disposed adjacent an open port (e.g., opening 108) in a housing (e.g., housing 106) of the wearable electronic device.

At step 606, processing circuitry such as processing circuitry 128 determines whether the pressure sensor and/or the open port are occluded based on the pressure data (e.g., by analyzing the pressure data). For example, occlusion may be detected when a change in pressure within a specific window of time is detected.

At step 608, if no occlusion is detected, activity data such as exercise statistics may be generated for a wearer of the wearable electronic device (e.g., using the pressure data by converting a barometric pressure measured by the pressure sensor into a device elevation). For example, one or more flights of stairs may be awarded to the wearer using a change in elevation determined using the determined measured pressure.

At step 610, if occlusion is detected, processing circuitry such as processing circuitry 128 may proceed to take corrective action to address occlusion of the pressure sensor or the open port. Correction action can include, as one example, rejecting the pressure sensor data from inclusion in determining exercise statistics for the wearer of device 100. For example, a heater of the device such as heater 132 may be operated to mitigate the occlusion. In one or more implementations, heater 132 may be a heating element disposed in cavity 304 or across opening 108 (as examples). Heater 132 may be operated to generate heat to facilitate ejection of a liquid occlusion with pulsed liquid heating in a two-phase process, as described with reference to FIGS. 3A-3B and 4A-4B.

Although the example of FIG. 6 describes the use of pressure sensor data (and associated occlusion detection operations) in the context of determining exercise statistics by an activity monitoring application of a wearable electronic device, it will be appreciated that the occlusion detection operations described herein can be applied to pressure sensors disposed in other devices and used for other applications, some examples of which have been described herein.

Figure 7:
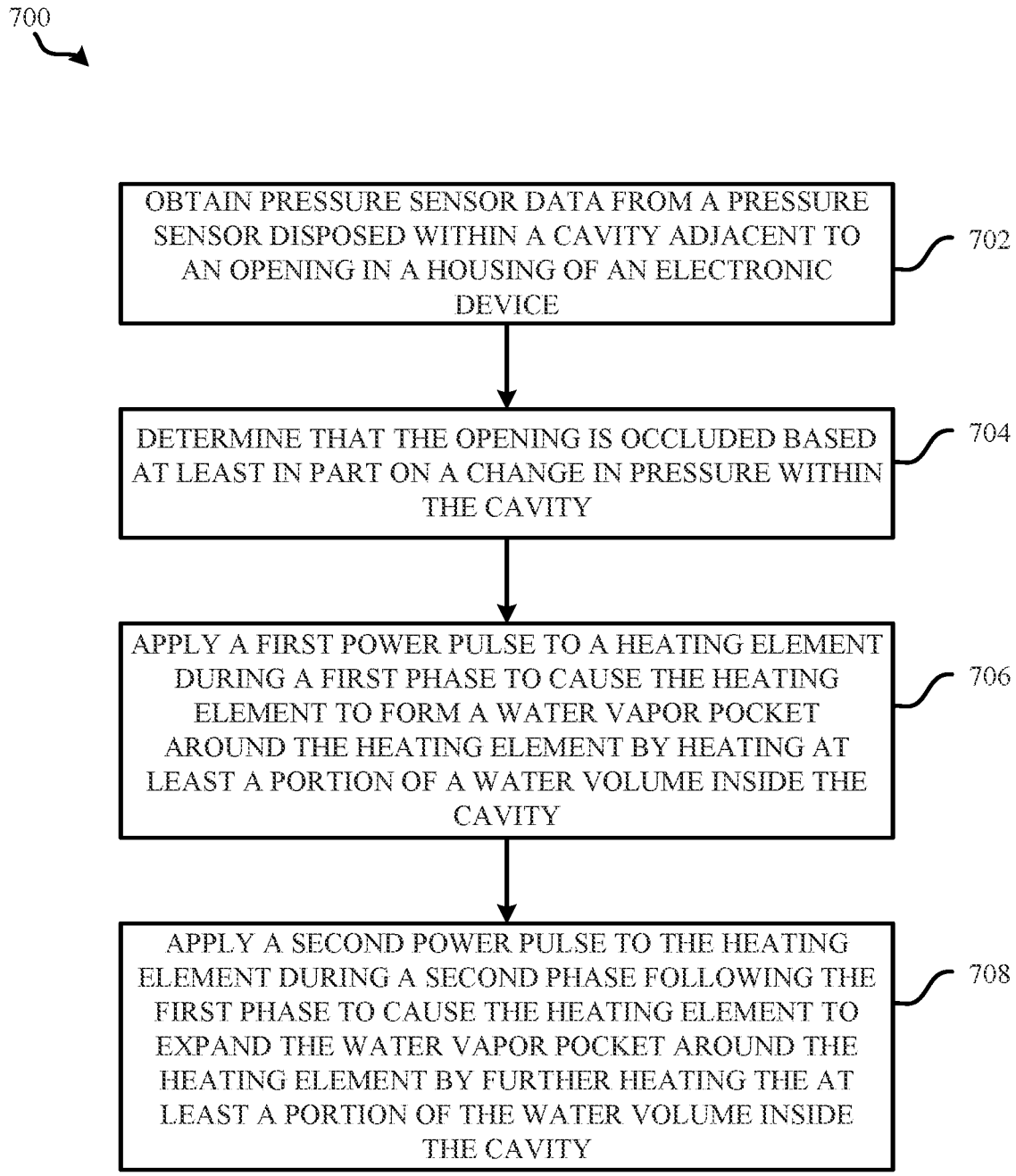
FIG. 7 illustrates a flow chart of an example process for taking corrective action for an identified pressure sensor occlusion in accordance with various aspects of the subject technology.

FIG. 7 depicts a flow diagram of an example process for determining whether the pressure sensor and/or the open port are occluded, in accordance with various aspects of the subject technology. For explanatory purposes, the example process of FIG. 7 is described herein with reference to the components of FIGS. 1-5. Further for explanatory purposes, some blocks of the example process of FIG. 7 are described herein as occurring in series, or linearly. However, multiple blocks of the example process of FIG. 7 may occur in parallel. In addition, the blocks of the example process of FIG. 7 need not be performed in the order shown and/or one or more of the blocks of the example process of FIG. 7 need not be performed.

At step 702, pressure data may be obtained with a pressure sensor (e.g., pressure sensor 102) disposed within a cavity (e.g., cavity 304) adjacent to an open port (e.g., opening 108) in a housing (e.g., housing 106) of the wearable electronic device (e.g., device 100).

At step 704, processing circuitry such as processing circuitry 128 determines that the pressure sensor and/or the open port are occluded based at least in part on a change in pressure within the cavity 304. For example, an occlusion is detected when the change in pressure over a specific window of time as indicated by the pressure data satisfies certain criteria indicative of occlusion. In one or more implementations, processing circuitry 128 obtains, based at least in part on a determination that the opening is occluded, one or more activity signals associated with the device 100. In one or more implementations, processing circuitry 128 determines whether water contact with the device 100 is proximate to completion based on the one or more activity signals. In one or more implementations, processing circuitry 128 activates the heater 132 in response to a determination that water contact with the device 100 is proximate to completion. In one or more implementations, processing circuitry 128 refrains from activating the heater 132 in response to a determination that water contact with the device 100 is not proximate to completion. In one or more implementations, processing circuitry 128 delays activation of the heater 132 in response to a determination that water contact with the device 100 is not proximate to conclusion.

At step 706, processing circuitry such as processing circuitry 128 applies a first power pulse to a heating element (e.g., heater 132) during a first phase to cause the heater 132 to form an air pocket around the heater 132 by heating at least a portion of a liquid volume inside the cavity 304.

At step 708, processing circuitry such as processing circuitry 128 applies a second power pulse to the heating element during a second phase following the first phase to cause the heating element to expand the water vapor pocket around the heating element by further heating the at least a portion of the water volume inside the cavity. In this regard, the expanded water vapor pocket may displace at least a portion of the occluded water trapped inside the cavity to be expelled out of the cavity. In some aspects, the first power pulse has a greater magnitude in power than the second power pulse. In some aspects, the second phase corresponds to a greater duration in time than the first phase. In some aspects, the second phase has a duration that varies in length based on a detection of a change in pressure in the cavity 304 of the pressure sensor 102 from the one or more pressure measurements.

In accordance with various aspects of the subject disclosure, a smart watch is provided that includes a housing having an opening. The smart watch also includes a pressure sensor disposed within a cavity adjacent to the housing and exposed to an environment external to the housing via the opening. The smart watch also includes processing circuitry configured to obtain pressure sensor data from the pressure sensor, determine that the opening is occluded based at least in part on a change in pressure within the cavity, apply a first power pulse during a first phase, and apply a second power pulse during a second phase following the first phase. The smart watch also includes a heating element associated with the pressure sensor and disposed within the cavity, the heating element configured to heat at least a portion of a water volume inside the cavity during the first phase based on the first power pulse to cause an air pocket to form around the heating element; and heat the at least a portion of the water volume inside the cavity during the second phase based on the second power pulse to cause the air pocket to expand around the heating element.

In accordance with other aspects of the subject disclosure, a method is provided that includes obtaining pressure sensor data from a pressure sensor of an electronic device; determining that an opening of the electronic device is occluded based at least in part on a change in pressure within a cavity adjacent the opening; applying a first power pulse to a heating element associated with the pressure sensor during a first phase to cause the heating element to form an air pocket around the heating element by heating at least a portion of a water volume inside the cavity; and applying a second power pulse to the heating element during a second phase following the first phase to cause the heating element to expand the air pocket around the heating element by further heating the at least a portion of the water volume inside the cavity.

In accordance with other aspects of the subject disclosure, an electronic device is provided that includes a housing having an opening. The electronic device also includes a pressure sensor disposed within a cavity adjacent to the opening and exposed to an environment external to the housing via the opening. The electronic device also includes a heating element associated with the pressure sensor and disposed within the cavity. The electronic device also includes processing circuitry configured to obtain pressure sensor data from the pressure sensor; determine that the opening is occluded based at least in part on a change in pressure within the cavity; apply a first power pulse to the heating element during a first phase to cause the heating element to form an air pocket around the heating element by heating at least a portion of a water volume inside the cavity; and apply a second power pulse to the heating element during a second phase following the first phase to cause the heating element to expand the air pocket around the heating element by further heating the at least a portion of the water volume inside the cavity.

In accordance with other aspects of the subject disclosure, an electronic device is provided that includes a housing having an opening. The electronic device also includes a particulate protection element disposed within the opening. The electronic device also includes a pressure sensor disposed within a cavity adjacent to the opening and exposed to an environment external to the housing via the opening. The electronic device also includes a heating element disposed within the cavity. The electronic device also includes processing circuitry configured to expel a water film that forms on one or more apertures of the particulate protection element by causing the heating element to form an air pocket around the heating element inside a cavity of the pressure sensor using a first power pulse during a first phase and further causing the heating element to expand the air pocket around the heating element using a second power pulse during a second phase.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device, comprising:
   a housing having an opening;
   a pressure sensor disposed within a cavity adjacent to the opening and exposed to an environment external to the housing via the opening;
   a heating element associated with the pressure sensor and disposed within the cavity; and
   processing circuitry configured to:
   obtain pressure sensor data from the pressure sensor;
   determine that the opening is occluded based at least in part on a change in pressure within the cavity;
   apply a first power pulse to the heating element during a first phase to cause the heating element to form a gas pocket around the heating element by heating at least a portion of a water volume inside the cavity; and
   apply a second power pulse to the heating element during a second phase following the first phase to cause the heating element to expand the gas pocket around the heating element by further heating the at least a portion of the water volume inside the cavity.

2. The electronic device of claim 1, wherein the first power pulse has a greater magnitude in power than the second power pulse.

3. The electronic device of claim 1, wherein the second phase corresponds to a greater duration in time than the first phase.

4. The electronic device of claim 1, further comprising a gel layer positioned inside the cavity of the pressure sensor, wherein the heating element is embedded within the gel layer.

5. The electronic device of claim 1, wherein the processing circuitry is further configured to:
   obtain, based at least in part on a determination that the opening is occluded, one or more activity signals associated with the electronic device; and
   determine whether water contact with the electronic device is proximate to completion based on the one or more activity signals.

6. The electronic device of claim 5, wherein the processing circuitry is further configured to activate the heating element in response to a determination that water contact with the electronic device is proximate to completion.

7. The electronic device of claim 5, wherein the processing circuitry is further configured to refrain from activating the heating element in response to a determination that water contact with the electronic device is not proximate to completion.

8. The electronic device of claim 5, wherein the processing circuitry is further configured to delay activation of the heating element in response to a determination that water contact with the electronic device is not proximate to conclusion.

9. The electronic device of claim 1, wherein the second phase has a duration that varies in length based on a detection of a change in pressure in the cavity of the pressure sensor from one or more pressure measurements with the pressure sensor.

10. An electronic device, comprising:
    a housing having an opening;
    a particulate protection element disposed within the opening;
    a pressure sensor disposed within a cavity adjacent to the opening and exposed to an environment external to the housing via the opening;
    a heating element disposed within the cavity; and
    processing circuitry configured to:
    expel a water film that forms on one or more apertures of the particulate protection element by causing the heating element to form a gas pocket around the heating element inside a cavity of the pressure sensor using a first power pulse during a first phase and further causing the heating element to expand the gas pocket around the heating element using a second power pulse during a second phase.

11. The electronic device of claim 10, wherein the first power pulse has a greater magnitude in power than the second power pulse.

12. The electronic device of claim 10, wherein the second phase corresponds to a greater duration in time than the first phase.

13. The electronic device of claim 10, further comprising a gel layer positioned inside the cavity of the pressure sensor, wherein the heating element is embedded within the gel layer.

14. The electronic device of claim 10, wherein the processing circuitry is further configured to:
obtain, based at least in part on a determination that the opening is occluded, one or more activity signals associated with the electronic device; and
determine whether water contact with the electronic device is proximate to completion based on the one or more activity signals.

15. The electronic device of claim 14, wherein the processing circuitry is further configured to activate the heating element in response to a determination that water contact with the electronic device is proximate to completion.

16. The electronic device of claim 14, wherein the processing circuitry is further configured to refrain from activating the heating element in response to a determination that water contact with the electronic device is not proximate to completion.

17. The electronic device of claim 14, wherein the processing circuitry is further configured to delay activation of the heating element in response to a determination that water contact with the electronic device is not proximate to conclusion.

18. The electronic device of claim 10, wherein the second phase has a duration that varies in length based on a detection of a change in pressure in the cavity of the pressure sensor from one or more pressure measurements with the pressure sensor.

19. A smart watch, comprising:
a housing having an opening;
a pressure sensor disposed within a cavity adjacent to the housing and exposed to an environment external to the housing via the opening;
processing circuitry configured to:
obtain pressure sensor data from the pressure sensor,
determine that the opening is occluded based at least in part on a change in pressure within the cavity,
apply a first power pulse during a first phase, and
apply a second power pulse during a second phase following the first phase; and
a heating element associated with the pressure sensor and disposed within the cavity, the heating element configured to:
heat at least a portion of a water volume inside the cavity during the first phase based on the first power pulse to cause a gas pocket to form around the heating element; and
displace at least a portion of the water volume inside the cavity by causing the gas pocket to expand around the heating element during the second phase based on the second power pulse.

* * * * *